United States Patent [19]

Lewiner et al.

[11] Patent Number: 5,637,848

[45] Date of Patent: Jun. 10, 1997

[54] PAYMENT INSTALLATION FOR A TRANSPORT NETWORK

[75] Inventors: Jacques Lewiner, Saint-Cloud; Eric Carreel, Paris, both of France

[73] Assignee: Jean-Claude Decaux, Neuilly sur Seine, France

[21] Appl. No.: 582,804

[22] Filed: Jan. 4, 1996

Related U.S. Application Data

[63] Continuation of Ser. No. 253,075, Jun. 2, 1994, abandoned.

[30] Foreign Application Priority Data

Jun. 4, 1993 [FR] France .................................. 93 06726

[51] Int. Cl.$^6$ .................................................. G07B 15/02
[52] U.S. Cl. ................................................ 235/384; 235/380
[58] Field of Search ...................................... 235/384, 380; 364/424.01, 424.02, 443

[56] References Cited

U.S. PATENT DOCUMENTS

| 4,713,661 | 12/1987 | Boone et al. | 340/994 |
| 5,202,550 | 4/1993 | Kocznar | 235/382 |
| 5,266,785 | 11/1993 | Sugihara | 235/384 |

FOREIGN PATENT DOCUMENTS

| 0057602 | 1/1982 | European Pat. Off. . |
| 0330071 | 2/1989 | European Pat. Off. . |
| 0380377 | 1/1990 | European Pat. Off. . |
| 0451756 | 10/1991 | European Pat. Off. . |
| 0538514 | 10/1991 | European Pat. Off. . |
| 2674975 | 4/1991 | France . |
| 2664075 | 6/1991 | France . |
| 2624677 | 12/1991 | France . |
| 2206594 | 8/1990 | Japan . |
| 2180677 | 4/1987 | United Kingdom . |
| 2191029 | 12/1987 | United Kingdom . |

*Primary Examiner*—Donald T. Hajec
*Assistant Examiner*—Karl D. Frech
*Attorney, Agent, or Firm*—Larson and Taylor

[57] ABSTRACT

The installation is designed to inform users of a bus network about waiting times for buses at stops in the network. An installation comprises a central station suitable for transmitting radio signals about the real instantaneous positions of the buses, and portable receiver appliances (1) suitable for displaying bus waiting times on screens (4). Each appliance can also serve as a ticket for travel purposes, being provided, for this purpose, with means (10) containing "validity" data (e.g. corresponding to a sum of money or to an expiry date) that can be checked remotely by "ticket-stamper" means (9) and that is also remotely "renewable" from the central station.

4 Claims, 2 Drawing Sheets

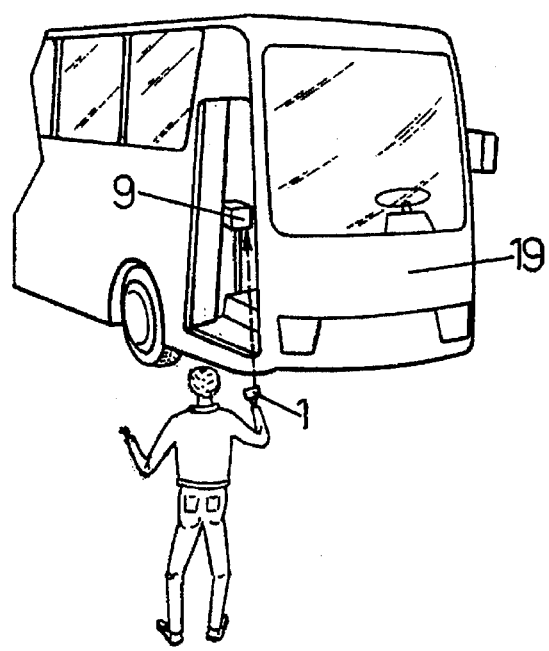
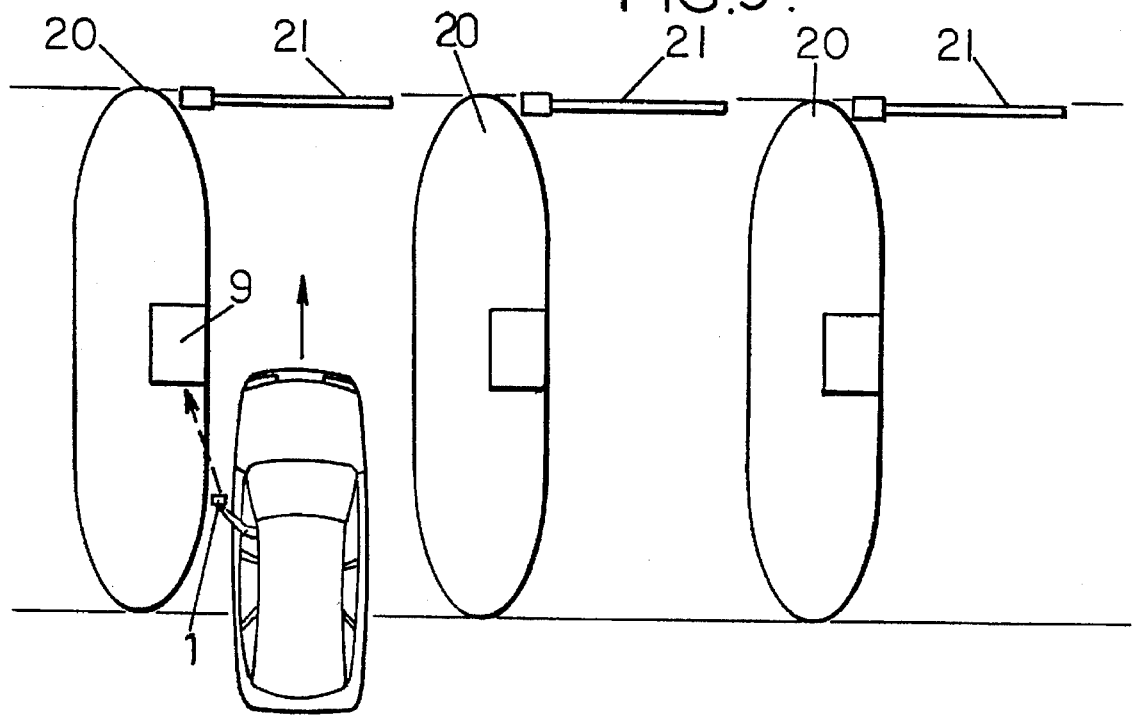

PAYMENT INSTALLATION FOR A TRANSPORT NETWORK

This application is a continuation of application Ser. No. 08/253,075 filed Jun. 2, 1994, now abandoned.

BACKGROUND OF THE INVENTION

1. Field of the Invention

The invention relates to installations designed to enable users of transport networks to pay sums that correspond to journeys taken by said users on-board vehicles travelling over said networks.

2. The Prior Art

Among installations of the type to which reference was made in the preceding paragraph, the invention more particularly relates to those which comprise:

firstly travel tickets made available to users in return for payment, each of the tickets including means for recording thereon quantifiable validity data or the equivalent (a sum of money, a number of authorized stages, an expiry date, etc . . . . ) corresponding to the payment made, and means responsive to remotely transmitted signals making it possible to implement successive reductions in the validity data, if quantifiable, until it has been reduced to zero, or else to consult said data; and also at least one ticket-stamper located close to a passage giving access to the network, which ticket-stamper includes means responsive to presentation by a user of a ticket of the above-specified kind for authorizing a given trip over the network, for remotely checking the validity state of said ticket and for remotely subtracting a quantity corresponding to the trip in question from the validity data recorded in the ticket, if said data is quantifiable.

Such installations are advantageous in that they make user access to the network very simple: there is no longer any need for users physically to pay money to an employee of the network when gaining access thereto, where making payment in that way often requires the return of change and can constitute an operation that is particularly lengthy and tedious.

However, in known installations of the kind in question, once the credit stored on a ticket has been used up then that ticket is finished and is of no further use.

To gain new authorization to use the network again, the user must then acquire a new ticket in return for new payment and for that purpose must go to an appropriate ticket office or window.

SUMMARY OF THE INVENTION

The invention makes it possible to avoid that drawback by making it possible to renew the validity of the ticket (in terms of money, in terms of duration, etc. . . . ) at any desirable location and without it being necessary for the user to go to a renewing point.

To this end, according to the invention, the payment installation of the kind in question is essentially characterized in that it further comprises:

on each ticket, coded identification means for said ticket and coded means lending themselves to renewing validity data remotely into said ticket in response to receiving suitable electromagnetic signals; and at a central station, means suitable for transmitting electromagnetic signals to the tickets to be renewed, which signals are generated in such a manner as to enable them to be automatically selectable by said tickets and being suitable for remotely renewing the validity data in said tickets.

Naturally, the signals in question are transmitted in response to payment of appropriate sums by a user holding a ticket that needs renewing to the undertaking that manages the installation.

In some cases, it could be considered as being relatively complicated and expensive to provide such additional equipment in an installation, particularly if the additional equipment was intended solely for the purpose of renewing tickets as described above.

This is where a particularly advantageous improvement of the invention is applicable.

This improvement lies in combining the general idea described above as applied to a bus network with the idea of providing users of the network with portable appliances that receive appropriate electromagnetic signals for the purpose of informing users on waiting times for buses to be caught.

Such portable receiver appliances are described, for example, in the Applicant's French patent No. 92 09042 which corresponds to copending U.S. Patent application Ser. No. 211,085.

Information installations fitted with such appliances already comprise:

a central station organized to generate and to transmit operating electromagnetic signals to the appliances; and in each appliance, receiver circuits suitable for identifying and making use of some of said signals.

The above-mentioned combination which constitutes the preferred improvement of the invention, thus reduces purely and simply to using the portable receiver appliances of the above-mentioned installation as tickets in the installation as described initially.

In a variant of the invention, the installation under consideration is applied to paying tolls on a motorway network.

The invention relates not only to installations of the kind in question in general, but also to the above renewable tickets, and more particularly to the portable receiver appliances that act as tickets in the preferred embodiment.

In addition to the main dispositions explained above, the invention includes certain other dispositions that are preferably used simultaneously therewith and that are described in greater detail below.

There follows a description of a preferred embodiment of the invention naturally given by way of non-limiting example and made with reference to the accompanying drawing;

BRIEF DESCRIPTION OF THE DRAWINGS

FIG. 4 is a schematic perspective view of the invention as used with a bus of a bus network; and FIG. 5 is a top view of the invention as used with a motorway toll network.

Referring to FIGS. 1, 2, and 3 of the drawing, there is shown diagrams of a portable receiver appliance in the preferred embodiment of the invention, said appliance being shown respectively during its normal "ticket-stamping" operation, during a refusal to operate because it is empty, and while being remotely renewed.

Figure 1:
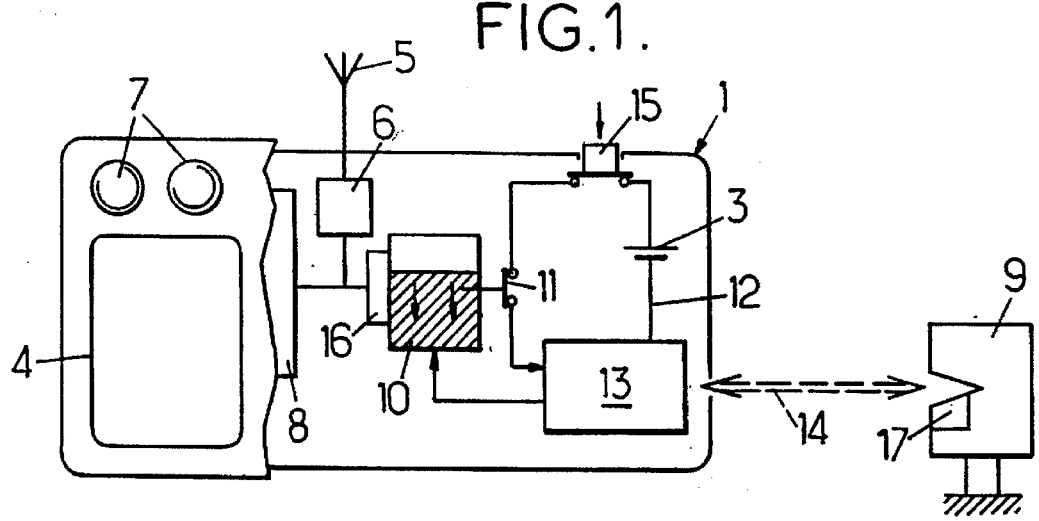
FIG. 1 is a schematic diagram of a portable receiver appliance in accordance with the preferred embodiment of the invention, showing use thereof in a normal "ticket-stamping" operation.

In the preferred embodiment under consideration, the idea is to inform the users of buses in an urban network who wish to catch such and such a bus at a given bus stop of a given line of the network, about the real waiting times for the "next buses" expected at the stop in question.

To this end, and as described for example in French patent No. 92 09042 referred to above, portable appliances 1 are provided and made available to users. These appliances are suitable for co-operating with a central station (indicated at 2 in FIG. 3) including a transmitter (indicated at 18) designed in such a manner as to generate and emit information signals S cyclically via an electromagnetic path. There signals relate, inter alia to the real instantaneous positions of respective buses of the network. The said appliances each include an electrical power source 3, user-actuatable interrogation means suitable for identifying each stop at which it is desired to catch a bus, means suitable for receiving the above signals and for selecting therefrom signals relating at least to the "next bus" expected at the identified bus stop, means suitable for generating information relating to the waiting times for such next buses at said bus stop, and means including a display screen (indicative at 4) suitable for displaying such information.

The above interrogation, reception, selection, and generating means comprise, in particular, a receiver antenna 5, a signal processing circuit 6 associated with said antenna for amplification, demodulation, and decoding purposes, control keys 7, and memory and calculation means 8 that are particularly light in weight and compact, and in particular of the microprocessor type.

The portable appliance I as described above is itself used as a travel ticket giving access to the buses of the network on being presented in the proximity of a ticket-stamping means or unit 9 for checking purposes. This is shown in FIG. 4, wherein a bus of the network is indicated at 19 an carries a ticket-stamping means 9. Ticket-stamping means or unit 9 a circuit 17 responsive to presentation by user of a ticket (appliance 1).

In conventional manner, the checking comprises the following two operations:

verifying whether or not the ticket is valid; and releasing a passage giving access to the desired vehicle.

A ticket's validity state is verified on the basis of one or the other of the following two techniques:

the state is defined by an end-of-subscription or "expiry" date F recorded on the ticket, in which case it suffices merely to verify that the date on which the ticket is "stamped" is earlier than the expiry date F; and the validity state of the ticket is defined by quantifiable data that is recorded or "loaded" in the ticket, which data may represent a certain sum of "credit" or a number of authorized bus trip stages; under such circumstances, "stamping" of the ticket gives rise automatically to said quantifiable data being reduced by a quantity that may optionally be related to the length of the trip that the user desires to take on the vehicle in question.

Figure 2:
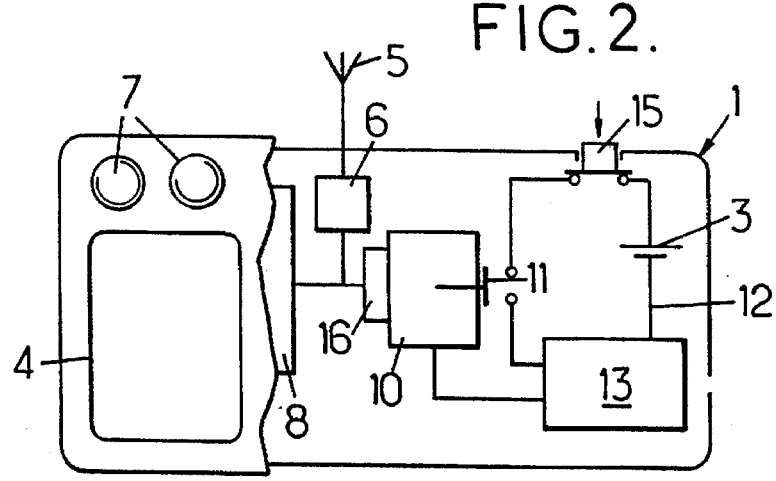
FIG. 2 is a schematic diagram similar to FIG. 1 showing the operation of the appliance when empty.
Figure 3:
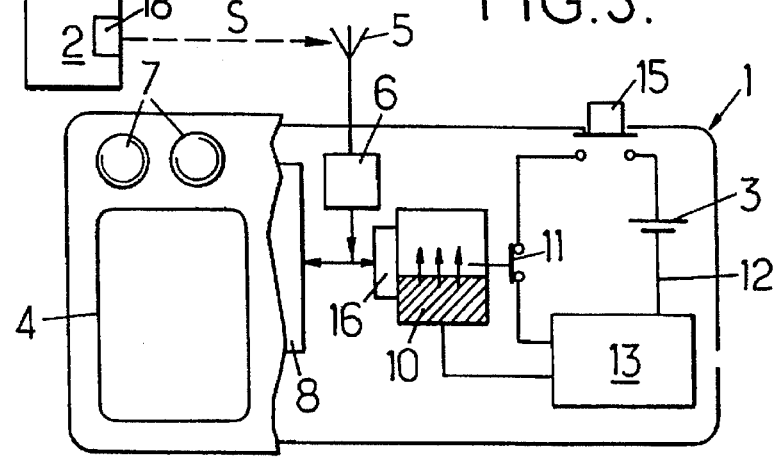
FIG. 3 is a schematic diagram similar to FIG. 1, showing remote renewal of the appliance.

In FIGS. 1 to 3, the box 10 represents a circuit responsive to the validity state of the ticket: the degree of validity of the ticket is represented by the shaded area of said box, and the small arrows in said area show the direction in which the degree of validity in question is changing.

In other words, this degree of validity is decreasing in the example shown in FIG. 1, is zero in the example shown in FIG. 2, and is increasing in the example shown in FIG. 3.

To clarify the description, it is also assumed that the circuit 10 is associated with an electrical switch 11 inserted in the excitation or activation circuit 12 of a transmitter-receiver 13 suitable for co-operating remotely with the ticket-stamper 9, preferably by means of a radio link, an infrared link, or an acoustic link.

The signals interchanged between the units 9 and 13 are represented by double-headed arrows 14 in FIG. 1. Thus, presentation of the "ticket" to circuit 17 of unit 9 is carried out remotely, as described.

FIG. 1 also shows:

that the circuit 10 is connected firstly to the output of the signal processing circuit 6 via an appliance identifier circuit 16, and secondly to the transmitter-receiver 13; and that excitation of the ukcitation circuit 12 is under the control of a pushbutton 15 that projects from the appliance and is actuatable by the user, and which may be of use in economizing drain on the power supply 3.

The appliance 1 as described above is used as follows.

So long as the appliance is valid, i.e. so long as the circuit 10 is not empty, switch 11 is closed.

Under such circumstances, it suffices to bring the appliance up to the ticket-stamper 9 (optionally while also pressing on the pushbutton 15 if such a pushbutton is provided) to ensure that the above-defined ordinary ticket "stamping" operations take place, as represented in FIG. 1 by the arrows 14.

Once the appliance 1 is no longer valid, e.g. by its circuit 10 being completely empty or because an expiry date recorded in an appropriate memory of the appliance has been passed, the switch 11 opens (FIG. 2) and it is no longer possible to excite the transmitter receiver 13. The appliance becomes unusable.

It is then possible to reactivate it remotely or to "resubscribe" by means of the electromagnetic signals S generated by the transmitter 18 of the central station 2 (FIG. 3) providing the user of the appliance has prepaid a sum of money corresponding to a new subscription.

Such resubscription is performed only after the appliance has been correctly identified by a portion of the signals S by comparing them with an encoded identification symbol recorded in the appliance identifier circuit 16.

This may be physically embodied by actually renewing quantifiable data as defined above into the circuit or store memory 10. It may also be embodied by replacing an expired end-of-subscription date with a new expiry date that is later than the instant at which said replacement takes place.

This operation may be performed in application of the teaching in the co-pending U.S. patent application Ser. No. 08/235,320 filed on the same day by the present applicant and entitled "An installation for informing users of a bus network about waiting times for the buses".

Regardless of the particular method of reactivation that is adopted, the appliance is then again suitable for making individual and successive payments in respect of future bus trips to be taken by the user holding the appliance, and this will continue until the new subscription under consideration comes to an end.

As a result, and regardless of the embodiment adopted, an installation is obtained for informing users of a public transport network, and in which the structure and the operation of the installation can be seen sufficiently clearly from the above.

Over presently known installations, the installation of the invention has the advantage of making it possible to revalidate remotely the tickets carried by users, without any direct intervention on the part of users other than making payment for new periods of subscription, which payments may be made automatically in any desirable manner.

In addition, in the preferred embodiments of the invention that make use of portable receiver appliances designed for displaying bus waiting times, the same appliances can be used as "tickets" enabling payments to be made in respect of successive bus trips taken by users of the network.

It may also be highly advantageous to combine the above-described characteristics concerning user subscriptions constituting payment for successive trips, with the characteristics explained in the above-specified French patent application for providing information that gives rise to each appliance displaying bus waiting times.

Subscriptions relating to the above two services may be combined so that the user need only make a single payment for both of them.

Naturally, and as can be seen from the above, the invention is not limited in any way to the particular applications and embodiments that have been described more particularly; on the contrary, it extends to any variants thereof, and in particular:

variants in which the travel ticket under consideration, which is valid only temporarily and can be renewed remotely when its validity runs out, is not associated with a portable receiver appliance suitable for displaying bus waiting times;

variants in which the transport network in question is not a bus network, nor even a public transport network, but is a motorway network, with the remotely renewable tickets of the invention then enabling their holders to pay for tolls giving access to the motorways of the network; and variants in which each ticket is fitted with means enabling use thereof to be reserved to authorize bearers, which means may comprise, for example, various keys associated with appropriate circuits enabling said use in "ticket-stamping" circumstances to be dependent on a predetermined secret code being input by means of said keys. A variant or embodiment wherein the transport network is a motorway network is shown in FIG. 5 wherein the "ticket-stampers" 9 are located in toll booths 20 controlling access gates 21 for the motorway.

We claim:

1. An installation for enabling users of a bus network to pay sums corresponding to trips taken by users travelling on buses over the bus network, the installation comprising portable appliances for receiving electromagnetic signals and for displaying waiting times for a bus to be caught relative to at least one stop along the bus network, said portable appliance being made available to users in return for payment, and each of the said portable appliances further including means for recording validity data corresponding to the payment made, and means responsive to remotely transmitted signals for enabling accessing of said validity data, said installation further comprising at least one access control unit located close to a passage providing entry to the bus network, said access control unit including validation means responsive to presentation by user of a said portable appliance of said validity data for authorizing a given trip over the bus network, and for remotely checking whether said validity data is valid based on accessing of said validity data, each said portable appliance further comprising coded identification means for said portable appliance and coded means for renewing validity data remotely into said portable appliance in response to receiving suitable electromagnetic signals, and said installation further comprising, at a central station which is common to the entire bus network, means for transmitting said suitable electromagnetic signals to the portable appliances to be renewed, said suitable signals being generated in such a manner as to enable said suitable signals to be automatically selectable by said portable appliances and to provide remote renewing of the validity data in said portable appliances, said central station further comprising means for generating and transmitting to the portable appliances electromagnetic signals that convey data relating to said waiting times for a bus to be caught, and said portable appliances further including user-actuable interrogation means for identifying each stop at which a bus is desired to be caught, means for receiving said signals that convey data relating to said waiting times and for selecting therefrom signals relating at least to the next bus expected at an identified bus stop, means for generating information relating to the waiting times of said next bus at said identified bus stop, and means, including a display screen, for displaying said information.

2. An installation according to claim 1, wherein each portable appliance includes key means for enabling use of the portable appliance in connection with validation thereof by said validation means to be subject to the user keying in a secret code.

3. An installation according to claim 1 wherein said validity data comprises a quantifiable amount and said means responsive to remotely transmitted signals provides for successive reduction of said quantifiable amount until said amount is zero, and wherein said validation means accesses the quantifiable amount associated with the portable appliance being checked..

4. An installation according to claim 1 wherein said validity data comprises a predetermined time period and wherein said validation means remotely accesses the time period associated with a portable appliance being checked and determines whether that time period has expired.

* * * * *